United States Patent [19]
Kanekura et al.

[11] Patent Number: 5,826,098
[45] Date of Patent: Oct. 20, 1998

[54] DATA PROCESSING SYSTEM WHICH CONVERTS RECEIVED DATA PACKET INTO EXTENDED PACKET WITH PRESCRIBED FIELD FOR ACCUMULATION PROCESS

[75] Inventors: Hiroshi Kanekura; Tsuyoshi Muramatsu, both of Nara, Japan

[73] Assignee: Sharp Kabushiki Kaisha, Osaka, Japan

[21] Appl. No.: 654,520

[22] Filed: May 29, 1996

[30] Foreign Application Priority Data

May 29, 1995 [JP] Japan .................................. 7-130387

[51] Int. Cl.⁶ .................................................. G06F 13/00
[52] U.S. Cl. .............................. 395/800.26; 395/800.27; 395/377
[58] Field of Search .................... 395/800.01, 800.25, 395/800.26, 800.27, 377; 364/754.02

[56] References Cited

U.S. PATENT DOCUMENTS

| | | | |
|---|---|---|---|
| 5,001,663 | 3/1991 | Parulski et al. | 364/754.02 |
| 5,285,271 | 2/1994 | Gennetten | 358/500 |
| 5,341,506 | 8/1994 | Nohmi et al. | 395/800.26 |
| 5,402,369 | 3/1995 | Main | 364/757 |
| 5,404,539 | 4/1995 | Onozaki | 395/728 |
| 5,561,804 | 10/1996 | Kanekura | 395/800.25 |
| 5,629,882 | 5/1997 | Iwata | 364/725.03 |

FOREIGN PATENT DOCUMENTS 5-233853  9/1993  Japan .

*Primary Examiner*—Meng-Ai T. An

[57] ABSTRACT

A data processing apparatus which can carry out an accumulation operation spanning a plurality of packets within the same generation at high speed without increasing hardware cost includes an internal circular path for circulating an extended packet provided with an accumulated value field ACC, an operation unit, an arithmetic circuit, an adder, and a shifter. The operation unit adds an input data and a value of ACC according to an instruction code using the arithmetic circuit, the adder, and the shifter, and updates a data field of an output packet or the ACC field. The contents of the data field and the ACC field can be varied by changing the way of selecting in a selector. A packet without the ACC field is utilized for external input/output, so that the apparatus converts the form of the packet upon input/output.

25 Claims, 8 Drawing Sheets

| PRECEDING NODE NUMBER | INSTRUCTION CODE | NEXT NODE NUMBER |
|---|---|---|
| 1 | ACCUMULATION y | 2 LEFT |
| 2 | ACCUMULATION z | 3 LEFT |
| 3 | EXTERNAL OUTPUT | 4 LEFT |

90(108)

| | INSTRUCTION | GENERATION | NODE | DATA | Acc |
|---|---|---|---|---|---|
| (A) | ACCUMULATION x | φ | 1 LEFT | a | φ |
| (B) | ACCUMULATION x | φ | 1 RIGHT | b | φ |
| (C) | ACCUMULATION y | φ | 2 RIGHT | c | φ |
| (D) | ACCUMULATION z | φ | 3 RIGHT | d | φ |

FIG. 12

| INSTRUCTION | GENERATION | NODE | LEFT | RIGHT | Acc |
|---|---|---|---|---|---|
| ACCUMULATION x | φ | 1 | a | b | φ |

FIG. 13

| INSTRUCTION | GENERATION | NODE | DATA | Acc |
|---|---|---|---|---|
| ACCUMULATION x | φ | 1 | a+b | a+b |

FIG. 14

| ACCUMULATION y | φ | 2 LEFT | a+b | a+b |
|---|---|---|---|---|

FIG. 15

| ACCUMULATION y | φ | 2 | a+b+c | a+b+c |
|---|---|---|---|---|

FIG. 16

| ACCUMULATION z | φ | 3 | $\frac{a+b+c+d}{4}$ | $\frac{a+b+c+d}{4}$ |
|---|---|---|---|---| ns

DATA PROCESSING SYSTEM WHICH CONVERTS RECEIVED DATA PACKET INTO EXTENDED PACKET WITH PRESCRIBED FIELD FOR ACCUMULATION PROCESS

CROSS REFERENCE TO RELATED APPLICATIONS

This application is related to U.S. patent application Ser. No. 08/021,963, filed Feb. 24, 1993, U.S. Pat. No. 5,561,804, commonly assigned with the present invention.

BACKGROUND OF THE INVENTION

1. Field of the Invention

The present invention relates to a data processing apparatus and, more particularly to a data processing apparatus which enables an operation such as an accumulation process spanning at least three data packets.

2. Description of the Background Art

In a data processing apparatus which transmits and receives data in a form of a packet, there is a case in which a data process for at least three data packets is carried out. An example of such a process is an accumulation of input data within the same generation.

To execute such an accumulation, a conventional data processing unit implements a function of holding accumulated values by providing data latches, for example, same in number as the data required to be held. Such a conventional technique is disclosed in Japanese Patent Laying-Open No. 5-233853 which is the basis of above described related U.S. patent application Ser. No. 08/021,963 U.S. Pat. No. 5,561,804.

FIG. 1 schematically shows a structure of a multiplication unit 120 in the data processing unit disclosed in the Japanese Patent Laying-Open No. 5-233853. Referring to FIG. 1, multiplication unit 120 includes a decoder 140, data latch circuits 132, 134, 136 and 138, a data selector 144, an adder 142 for carrying out an adding process, a data selector 148, a multiplier 146 for carrying out a multiplication process, a synchronization control unit 130, and an accumulator unit formed of a data latch circuit 150 and a gate circuit G6 for holding a history value for a preceding generation inputs.

The operation of multiplication unit 120 is controlled by a transfer control circuit 124. Transfer control circuit 124 includes transfer control elements C1–C4. The transfer control element has a function of sequentially controlling data latches and transferring data according to a reception request signal and a transmission permission signal transmitted between itself and a preceding/succeeding transfer control element.

Multiplication unit 120 in the conventional data processing unit shown in FIG. 1 performs an accumulation adding operation in the following manner. A multiplication factor of n bits and data of n bits are provided as input data to multiplication unit 120. An instruction code of m bits is provided to decoder 140. Decoder 140 decodes the instruction code and generates a signal LOOP that becomes one only when the instruction is a prescribed accumulation adding process instruction, and provides the same signal to data latch circuit 132.

Data latch circuit 132 latches the two n-bit data of the input data and a factor as well as the signal LOOP when the reception request output of transfer control element C1 rises. The input to data latch circuit 134 becomes the data latched in data latch circuit 132. The data latched in data latch circuit 132 (left data) and the operation result of a preceding generation held in data latch circuit 150 are input to adder 142. Adder 142 adds the two values to provide the result to data latch circuit 134.

Data latch circuit 134 latches the input at a timing defined by the rising of the reception request output from transfer control element C2. As a result, the data provided to data latch circuit 136 and the data provided to data selector 144 are the values newly latched in data latch circuit 134.

Data selector 144 selects respectively the added result of adder 142 input from data latch circuit 134 to a terminal b when signal LOOP is one, and the input data provided to a terminal via data latch circuits 132, 134 when signal LOOP is zero. The selected value is supplied to data latch circuit 136.

Data latch circuit 136 latches the input data at a timing defined by the rising of the pulse of the reception request output by transfer control element C3. As a result, both the input to data latch circuit 138 and the input to multiplier 146 are values newly latched by data latch circuit 136.

A factor of n bits (right data) is provided to one input of multiplier 146. The added result of adder 142 or the data (left data) is provided to the other input when signal LOOP is one or zero, respectively. More specifically, multiplier 146 multiplies the factor by the added result of adder 142 when signal LOOP is one, and provides the same to data latch circuit 138. Multiplier 146 multiplies the right data by the left data when signal LOOP is zero, and provides the result to data latch circuit 138.

Data latch circuit 138 latches the data at a timing defined by the reception request output of transfer control element C4 and outputs the latched data to data selector 148.

The data provided to data selector 148 are as follows. When signal LOOP is zero, n-bit of data (left data) is directly supplied to one input c of data selector 148. The multiplied result of multiplier 146, i.e. the multiplied result of the left data by the right data is provided to the other input d. When signal LOOP is zero, data selector 148 selects the value of input d and provides the same as 2n-bit data. This output is processed to have n bits through a required shifting process by a subsequent shifter (not shown) and provided to a circular pipeline with its tag replaced.

When signal LOOP is one, the added result of adder 142 is applied to one input c of data selector 148. More specifically, the added value of the input data of n bits and the multiplication result of the last generation latched in data latch circuit 150 is provided to input c. This value is also provided to one input of multiplier 146. The multiplied result of multiplier 146 is supplied to the other input terminal d of data selector 148. More specifically, the multiplication result of the factor multiplied by the added result of an adder 142 is supplied to input d. However, in this case, the data selector 148 selects the input from input c and provides the same as data of n bits, in response to signal LOOP taking a value of one. More specifically, data selector 148 provides the added value of the data of n bits provided to multiplication unit 120 and the operation result of the feedback loop of the last generation.

Synchronization control unit 130 operates as follows. When an accumulation adding process instruction is input as an instruction code, decoder 140 provides signal LOOP of one. Gate G5 provides a pulse signal as a clock signal to gate G2. In response to this pulse, the flipflop of gate G2 is set and the Q output becomes one.

The output of gate G3 becomes zero in response to the output of gate G2 pulled up to one. As a result, G4 provides a zero to the transmission permission input of transfer control element C1 regardless of the value of the transmission permission signal provided from transfer control element C2. Therefore, the transmission permission input to transfer control element C1 attains a transmission prohibited state. Thus, when a signal supplied to decoder 140 is an accumulation adding process instruction, the latch of data latch circuit 132 is put into a standby state until the transmission permission input to transfer control element C1 becomes one.

When an instruction other than an accumulation adding process instruction is input, the output of decoder 140 becomes zero. As a result, the output of gate G3 becomes one, and gate G4 provides the transmission permission signal output from transfer control element C2 directly to transfer control element C1. Therefore in this case, the latch of the data input to multiplication unit 120 for data latch circuit 132 is not deferred.

A standby instruction of a loop instruction is cancelled as follows. Gate G6 generates a clock signal of data latch circuit 150 from the reception request output provided from transfer control element C and signal LOOP. Gate G6 always provides an output of one when signal LOOP is zero. Therefore, data latch circuit 150 will not latch the output of multiplier 146. If signal LOOP is one, gate G6 responds to the reception request signal output from transfer control element C4 and generates a clock signal which is provided to data latch circuit 150. The generation timing of the clock signal is simultaneous to the data latch timing of data latch circuit 138. Data latch circuit 150 latches the output of multiplier 146 at a timing defined by the rising of a clock signal provided from gate G6. The latched data is supplied again to one input of adder 142.

When a clock signal is provided from gate G6, gate G2 is reset via gate G1. The Q output of gate G2 accordingly returns to zero. In response, the output of gate circuit G3 becomes one, whereby gate circuit G4 will directly provide the transmission permission signal of transfer control element C2 to transfer control element C1. As a result, in response to the next instruction code, data latch by data latch circuit 132 is allowed, whereby execution of the next instruction is initiated.

Thus, a reference is made to a common accumulated value by a plurality of generations in the data processing unit disclosed in Japanese Patent Laying-Open No. 5-233853.

It is noted that "generation" or "generation number" herein cited refers to a concept for identifying the set of data to be processed in a data driven processor or the like which processes stream of data. In this case, the process of the stream of data refers to a process in which data are sequentially received and a plurality of sets of data are simultaneously processed in parallel. Specifically, the same generation number is applied to a set of input data, and sets of data are identified from each other. For example, generation numbers 0, 1, 2 . . . are applied to the input data according to the order of input.

"Intra-generation processing" refers to a case in which a set of simultaneously input values is processed separately from other sets of data as the program is proceeding.

"Node" is a concept for designating a process during the program. The origin of the term is that such a process is shown as a connection point (node) in a data flow graph. Respective connection points have their own identifiers.

When an accumulation circuit is implemented utilizing the apparatus disclosed in the Japanese Patent Laying-Open No. 5-233853, a common accumulated value is referenced by a plurality of generations. If an accumulation is to be carried out within the same generation in the data processing apparatus using such a conventional operation unit, for example, a program should be devised such that the completion of a reference to or an update of a data latch in one generation triggers permission of a reference or an update of the next generation, or an access control of a data latch by hardware is required. Such a process constitutes an overhead for the operation to be executed and an accumulation process operation at high speed can not be carried out when the conventional apparatus is used.

In order to separately carry out an accumulation process for individual generations, the processor could be furnished with a number of data latches. In this case, however, as many data latches as the number of generations processed simultaneously are necessary, and a control mechanism for controlling the plurality of data latches is also required. Therefore, the scale of circuit must be increased significantly in order to implement a high speed processing. Moreover, when an accumulation operation is carried out, a plurality of values will be added into one data latch, and an overflow will be more likely to be caused compared with a normal operation result.

When an operation unit is applied to various applications, the number of necessary data latches varies depending on the applications, so that the number of the data latches cannot be predetermined. That is, customizing, i.e. different operation apparatuses for different applications, is required which raises the cost of the apparatus.

SUMMARY OF THE INVENTION

It is therefore an object of the present invention to provide a data processing apparatus which can carry out, separately for respective generations, a high speed operation spanning at least three packets within the same generation without increasing hardware cost.

Another object of the present invention is to provide a data processing apparatus which can carry out, separately for respective generations, a high speed accumulation operation spanning at least three packets within the same generation without increasing hardware cost.

A further object of the present invention is to provide a data processing apparatus which can carry out, separately for respective generations, a high speed accumulation operation with high precision spanning at least three packets within the same generation without increasing hardware cost.

Still another object of the invention is to provide a data processing apparatus which can carry out, separately for respective generations, a high speed accumulation operation with high precision spanning at least three packets within the same generation, and can convert the result into an appropriate form to externally output the same without increasing hardware cost.

Still another object of the invention is to provide a data processing apparatus which can carry out, separately for respective generations, a high speed accumulation operation or the like with high precision spanning at least three packets within the same generation, with easy control and without increasing hardware cost.

Still another object of the invention is to provide a data processing apparatus which can carry out, separately for respective generations, a high speed accumulation operation with high precision spanning at least three packets within the same generation, with easy control and without increasing hardware cost.

Still another object of the invention is to provide a data processing apparatus which can carry out, separately for respective generations, a high speed accumulation operation or the like with high precision spanning at least three packets within the same generation, with easy control and without increasing hardware cost, and can externally input/output appropriate data.

A data processing apparatus according to the present invention externally inputs/outputs data in a regular packet form which has a destination field, a data field, and an instruction field. The data processing apparatus includes: an internal path for externally receiving a packet, converting the form of the packet into that of an extended packet with a prescribed field added thereto, and circulating it within the data processing apparatus; a matching control unit placed in the internal path for carrying out a matching of the packets necessary for the execution of an instruction and outputting a packet which contains all the data necessary for the execution of an instruction onto the internal path; an operation unit placed in the internal path for performing a process designated by a content of the instruction field based on data in the data field and the prescribed field of the packet output from the matching control unit and outputting a resultant packet which has an updated content of the data field or the prescribed field onto the internal path; a program storage placed in the internal path and prestoring a data flow program, for outputting a packet containing information about an instruction to be executed next onto the internal path using the packet output from the operation unit; and a branching unit placed in the internal path for branching the packets output from the program storage into the internal path and to the outside according to the content of the destination field, and converting the externally output packet from the extended packet to the regular packet.

In the data processing apparatus thus structured, the internal path externally receives a packet, converts the packet to an extended packet with a prescribed field added thereto and circulates the packet within the data processing apparatus. The matching control unit performs a matching of the packets necessary for the execution of an instruction and outputs a packet which contains all the data necessary for the execution of the instruction onto the internal path. The operation unit performs a process designated by the content of the instruction field based on data within the data field and the prescribed field of the packet output from the matching control unit, and outputs a resultant packet which has an updated content of the data field and the prescribed field onto the internal path. The program storage outputs a packet containing information about an instruction to be executed next onto the internal path using the packet output from the operation unit. The branching unit branches the packets output from the program storage into the internal path and the outside according to the content of the destination field. The branching unit also converts the externally output packet from a form of an extended packet to that of a regular packet.

As described above, the packet is converted to the extended packet with a prescribed field added thereto, internally circulated and processed to be externally output as a resultant packet in the form of a regular packet. When an intermediate result is required to be held to carry out an operation for at least three packets of the same generation, the operation can be repeatedly carried out separately for each generation within the data processing apparatus by storing and utilizing the intermediate result. It is not necessary to change hardware for different applications. An overhead is reduced since a special mechanism for controlling the processing order of respective operations, and that for performing a processing separately for each generation are not required. The rate of the processing is thus enhanced. The scale of a circuit can be reduced and the circuit is easily controlled. As a result, a data processing apparatus can be provided which can carry out, generation by generation separately, a high speed operation spanning at least three packets within the same generation without increasing hardware cost.

According to a preferred embodiment of this invention, the operation unit includes an arithmetic circuit which performs a process designated by the content of the instruction field to the content of the data field of the extended packet provided thereto, an adding circuit which adds the output from the arithmetic circuit to the content of the prescribed field of the supplied extended packet, and a packet assembling unit which assembles and outputs the extended packet based on the contents of the instruction field and the prescribed field of the supplied packet.

In the operation unit thus structured, the arithmetic circuit carries out a process designated by the content of the instruction field to the content of the data field of the extended packet, and the adding circuit adds the output from the arithmetic circuit to the content of the prescribed field of the extended packet. The packet assembling unit assembles and outputs the extended packet based on the content of the instruction field and the prescribed field of the supplied packet.

The extended packet can be assembled from the result of the processing designated by the content of the instruction field to the content of the data field of the extended packet, and the sum of the result and the content of the prescribed field of the extended packet. Therefore, an accumulated value of data of at least three packets within the same generation can be obtained without a complex control.

More preferably, a bit precision of the prescribed field is chosen higher than that of a bit precision of the data field of the regular packet. The possibility of an overflow in an accumulation operation is low, since the bit precision of the prescribed field is higher than that of the regular data field.

Still more preferably, the packet assembling unit includes a shifter which receives the output from the adding circuit, and shifts the output of the adding circuit by a prescribed number of bits in response to the content of the instruction field of the supplied packet, a first selector which receives the output of the shifter and the content of the prescribed field of the supplied packet, and selectively outputs the output of the shifter or the content of the prescribed field of the supplied packet in response to the content of the instruction field of the supplied packet, and a second selector which receives the output of the shifter and the output of the adding circuit, and selectively outputs the output of the shifter or the output of the adding circuit in response to the content of the instruction field of the supplied packet.

The shifter shifts the output of the adding circuit by a prescribed number of bits in response to the content of the instruction field. The first selector receives the output of the shifter and the content of the prescribed field of the packet and, in response to the content of the instruction field of the packet, selectively outputs the output of the shifter or the content of the prescribed field of the packet. The second selector selectively outputs the output of the shifter or the adding circuit in response to the content of the instruction field of the packet.

The output of the adding circuit can be stored in the data field or the prescribed field of the packet with or without a shifting by the prescribed number of bits. An operation result within the data processing apparatus can be output after converting it into a proper form.

More preferably, the internal path has a function of setting an initial value defined according to a prescribed method in the prescribed field when an externally received packet is converted to an extended packet. The initial value may, for example, be a fixed value or the initial value defined according to the content of the received packet. When the packet is converted into the extended packet, the initial value defined according to the prescribed method can be set in the prescribed field. Various operations can be implemented easily maintaining the control of the operation within the data processing apparatus.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, features, aspects and advantages of the present invention will become more apparent from the following detailed description of the present invention when taken in conjunction with the accompanying drawings, which are given by way of illustration only, and thus are not limitative of the present invention, and wherein.

FIGS. 12, 13, 14, 15, and 16 show packets generated during the process of FIG. 9.

DETAILED DESCRIPTION OF THE PREFERRED EMBODIMENTS

Figure 3:
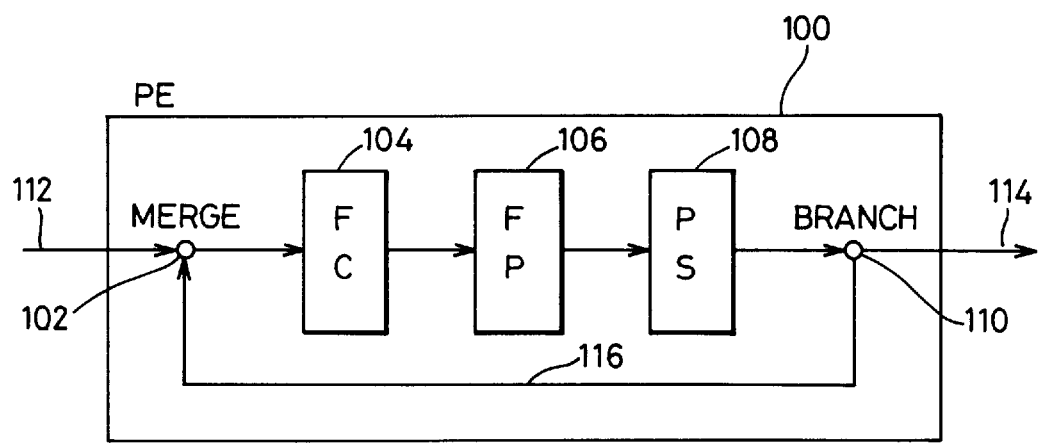
FIG. 3 is a schematic block diagram of a data driven processor in an embodiment of a data processing apparatus of the present invention.

FIG. 3 schematically shows a structure of a data driven processor 100 as one example of a data processing apparatus which externally inputs/outputs data in a packet form. The present invention will be described according to one example in which the invention is applied to the data driven processor. It is noted that the embodiments described below are just examples, and the invention can be applied to the data processing apparatuses other than the data driven processor.

Data driven processor 100 includes: a circular path 116 for internally circulating a data packet; a merging unit 102 provided in circular path 116 for merging the data packet externally supplied via a path 112 into circular path 116; a matching control unit 104 for carrying out matching of two data which are to be a set for execution of 2-input operation, generating a packet provided with all the necessary data for an operation from a pair of packets and outputting the same; an operation unit 106 for carrying out an arithmetic and logic operation process including an accumulation operation for the packet provided from matching control unit 104 and outputting a resultant packet; a program storage 108 for adding information concerning an instruction to be executed next to the packet using the result provided from operation unit 106 and outputting the packet onto circular path 116; and a branching unit 110 provided in circular path 116 for branching the output packet from program storage 108 into an external path 114 and circular path 116 according to the content of its destination field. It is noted that matching control unit 104 immediately outputs the packet without performing a matching for a one-input instruction.

A desired process for a packet is completed through several circulations of the packet within this processing system. To the completely processed packet, an instruction to output the packet out of the processing system is stored instead of the information concerning the next instruction in the program storage 108, and branching unit 110 detects that the instruction is an external output instruction and outputs the packet onto path 114.

Figure 1:
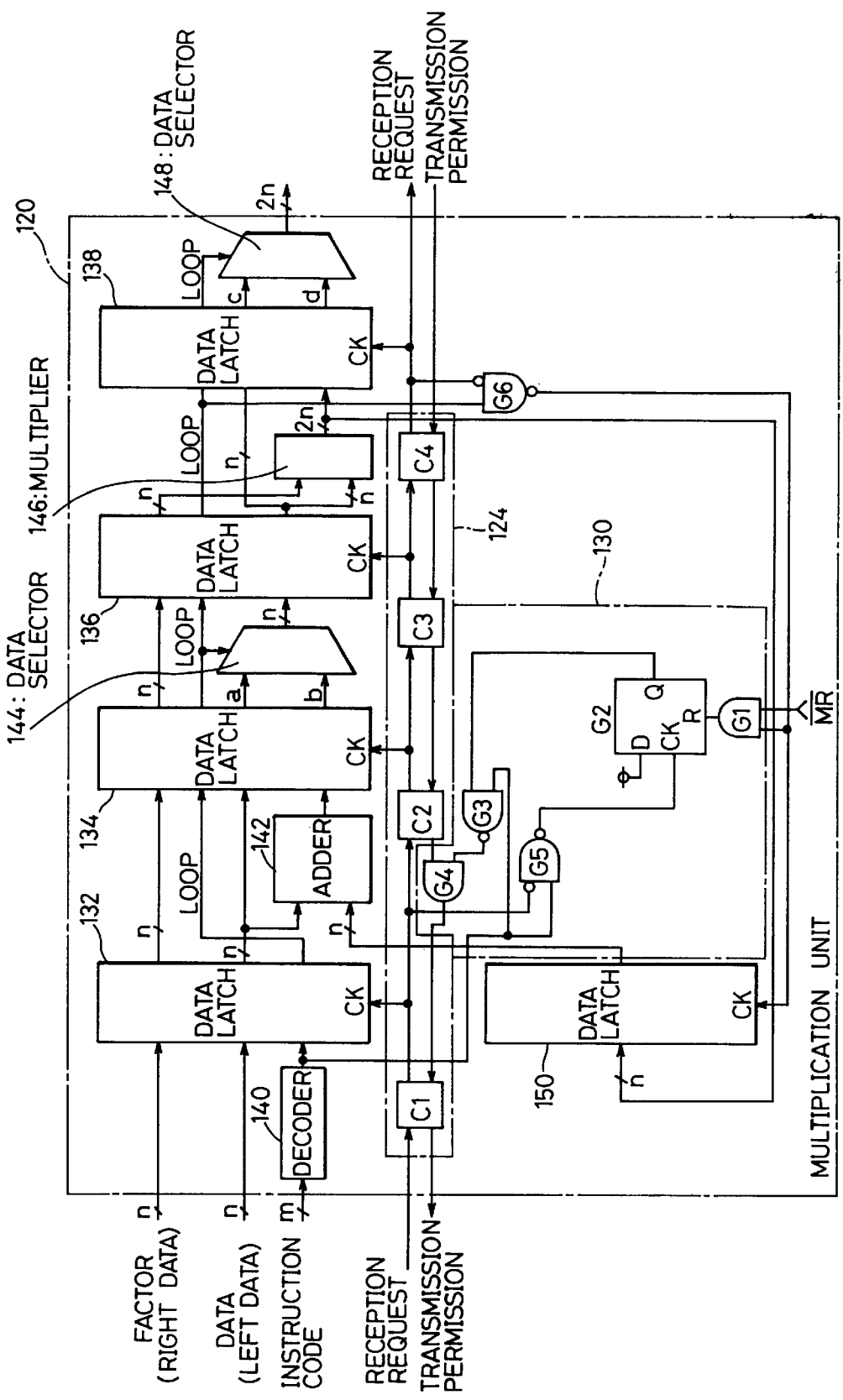
FIG. 1 is a block diagram of a multiplication unit employed in one example of a conventional data processing apparatus.
Figure 2:
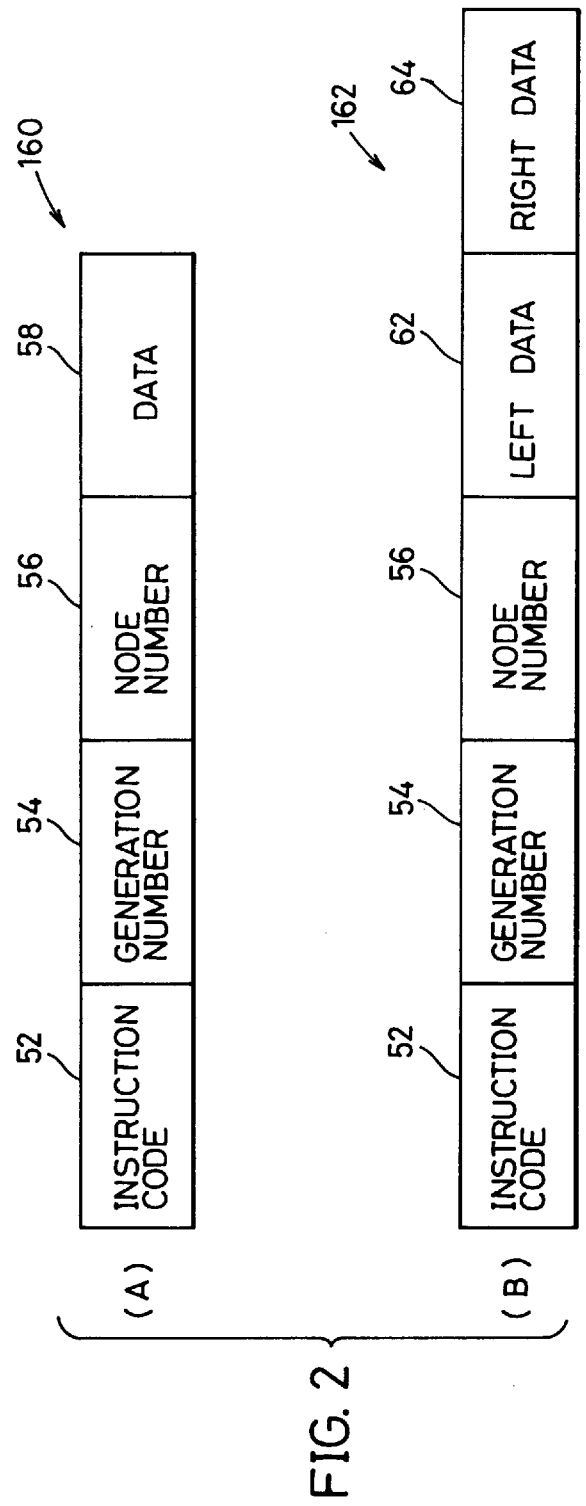
FIG. 2 illustrates packets used in one example of a data driven processor.

In a conventional data processing apparatus, the data packet output from matching control unit 104 has the form of a packet 162 shown in FIG. 2(B), and the form of the packet in the other units is the one shown in FIG. 2(A). As for the conventional form of the data packet, a packet 160 shown in FIG. 2(A) includes a field of an instruction code 52, a generation number field 54, a node number field 56, and a data field 58. Referring to FIG. 2(B), packet 162 output from matching control unit 104 includes instruction code field 52, generation number field 54, node number field 56, a left data field 62, and a right data field 64.

Figure 5:
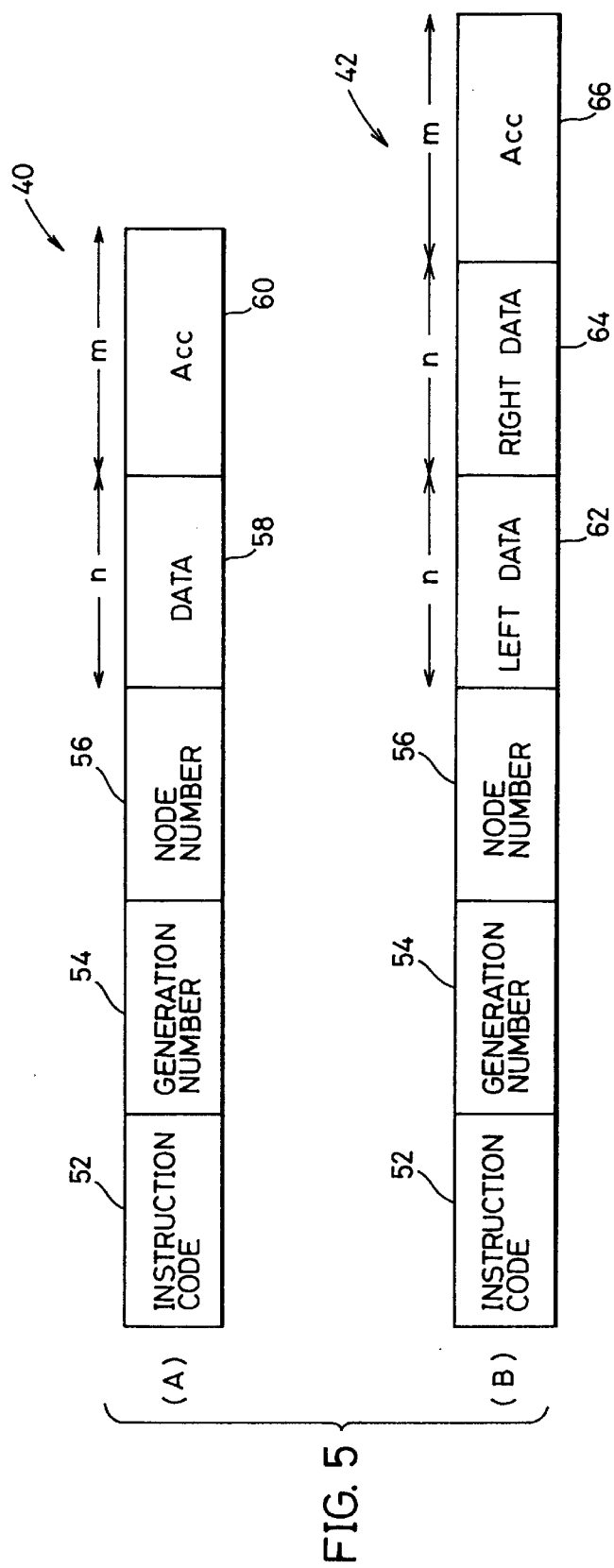
FIG. 5 shows forms of extended packets used in the data driven processor shown in FIG. 3.

On the other hand, in data driven processor 100 according to an embodiment of the present invention shown in FIG. 3, a packet of the form shown in FIG. 5 is used. Referring to FIG. 5(B), in addition to instruction code field 52, generation number field 54, node number field 56, left data field 62 and right data field 64, a packet 42 output from matching control unit 104 includes an accumulated value (hereinafter referred to as "ACC") holding field 66. With reference to FIG. 5(A), in data driven processor 100 shown in FIG. 3, a packet 40 used in other units includes an ACC field 60 in addition to instruction code field 52, generation number field 54, node number field 56 and data field 58.

Data field 58, left data field 62, and right data field 64 are of n bits, and the ACC field is of m (m>n) bits. For example, n is "12", and m is "24". The reason for the larger number of bits of the ACC field than that of a regular data field is as follows. It is assumed that an accumulation addition is carried out for data of an 8 bits precision with, for example, n=m=12. In this case, an added result possibly overflows the data field of 12 bits when 16 values are added. In the present invention, an output of an incorrect result of the operation due to an overflow is eliminated by providing an ACC field with the width of m bits, m being larger than n.

Figure 4:
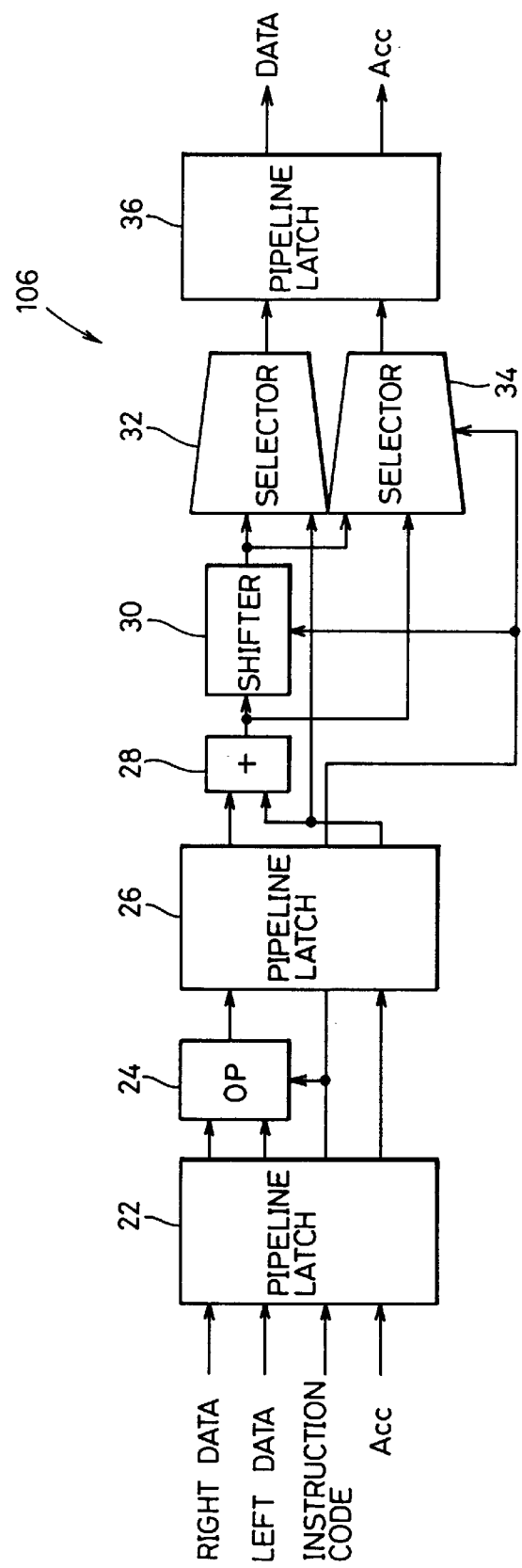
FIG. 4 is a block diagram of an operation unit.

FIG. 4 schematically shows a functional structure of operation unit 106. With reference to FIG. 4, operation unit 106 includes pipeline latches 22, 26 and 36, an arithmetic circuit 24, an adder 28, a shifter 30, and selectors 32 and 34.

Pipeline latch 22 serves to temporarily latch the right data, the left data, the instruction code and the ACC of the packet.

Arithmetic circuit 24 serves to execute a process for the right data and the left data applied by pipeline latch 22 according to the instruction code supplied by pipeline latch 22 to provide its result to pipeline latch 26.

Pipeline latch 26 serves to temporarily latch the output of arithmetic circuit 24, the instruction code, and the ACC to provide those to adder 28, and selectors 32 and 34.

Adder 28 serves to add the output of arithmetic circuit 24 supplied via pipeline latch 26 and the ACC supplied via pipeline latch 26 to provide the added result to shifter 30 and selector 34.

Shifter 30 serves to shift the output of adder 28 by prescribed bits according to the instruction code provided via pipeline latch 26 to provide the result to selectors 32 and 34.

Selector 32 serves to select either the output from shifter 30 or the ACC according to the instruction code, and output the selected one as data of the output packet via pipeline latch 36.

Selector 34 is controlled by the instruction code, and serves to output either the output of shifter 30 or the output of adder 28 as a value of the ACC field of the output data packet via pipeline latch 36.

With reference to FIG. 4, the right data and the left data within the packet are processed in arithmetic circuit 24, and the result is added to the accumulated value (ACC) by adder 28. The result of the addition is offset by shifter 30 and provided to selectors 32 and 34. Depending on which input is selected by selectors 32 and 34, the value of the ACC field can be updated, the result can be output to an output data field, or the output from shifter 30 can be stored in the data field while the output from adder 28 can be stored in the ACC field. The content of an arithmetic operation and details of the shift process will be hereinafter described.

Referring to FIG. 3 again, if the accumulation process described above is closed within the processing system (data driven processor 100) shown in FIG. 3, it is unnecessary to provide the ACC field shown in FIG. 5 to the packet externally input/output to and from data driven processor 100, considering the saving of hardware. Therefore, the packet of conventional form shown in FIG. 2 can be utilized as packets on paths 112 and 114. The bit width of the path for transmitting packets in the overall system is thus reduced, saving hardware.

As shown above, when a packet form similar to the conventional one is used for external input/output, the regular form packet externally input to the processing system is required to be converted to the extended packet form having the ACC field shown in FIG. 5 in order to execute an accumulation process within the processing system. This process may be carried out, for example, in matching unit 104 shown in FIG. 3 or a dedicated circuit may be provided upstream of matching unit 104.

When the packet form is converted from the regular packet form to the extended packet form as above, preferably an appropriate initial value is supplied to the ACC field. For example, as a general method, the ACC field may be initialized using the fixed data of zeroes, or a desired initial value other than zeroes. In the data driven processor according to the invention, an operation of initializing the content of the ACC field is also provided other than the accumulation operations shown below. If instruction code 52 of the packet input in the format shown in FIG. 2(A) is a prescribed ACC initialization instruction, for example, the n-bit data stored in data field 58 is sign-extended to m-bit data, stored in the ACC field of packet 40 shown in FIG. 5(A), and then the packet 40 is applied into data driven processor 100. It is noted that the sign-extension refers to an operation of filling (m−n) bit in MSBs (most significant bits) of m bits with the value of the most significant bit of n-bit data, to yield m bit-data.

Figure 6:
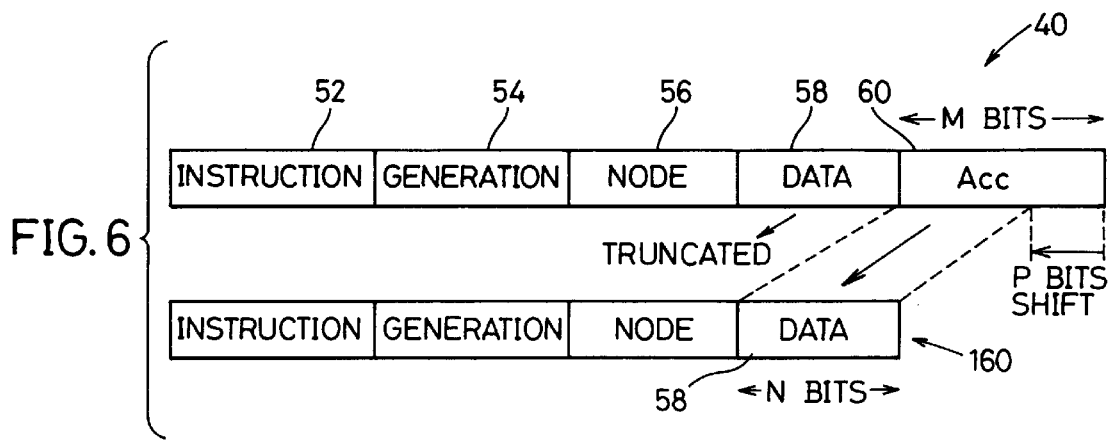
FIG. 6 shows a way of converting data when ACC is externally output.
Figure 7:
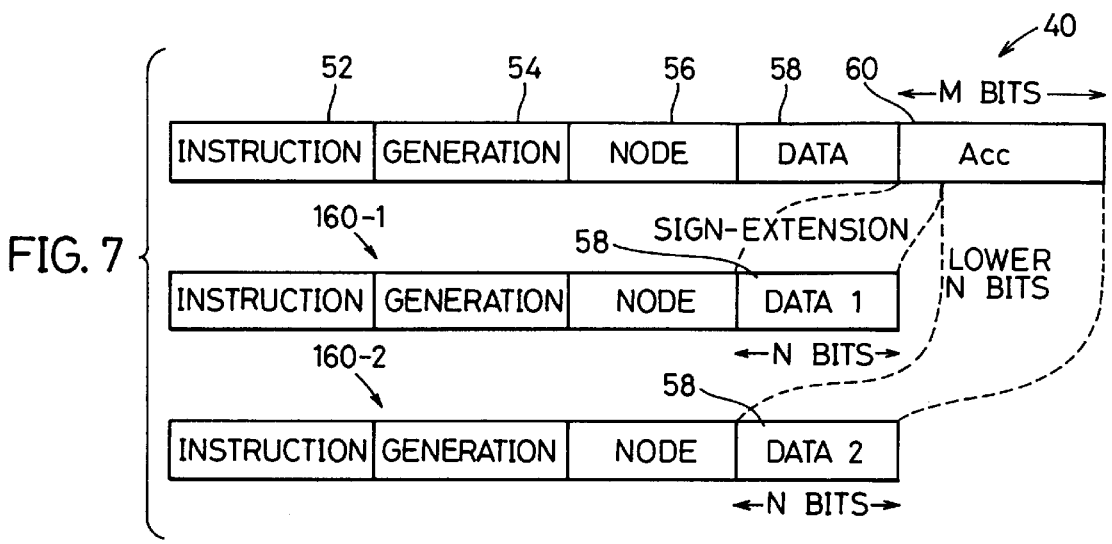
FIG. 7 shows another way of converting data when a value of ACC is externally output.

When the reference is made to the content of the ACC field, it is necessary to output the content of the ACC field externally in the form of packet 160 shown in FIG. 2(A). In this case, the ACC field is of m bits width, and data field 58 of packet 160 is of n bits width, so that the content of the ACC field cannot be contained in data field 58 as it is. Then, the content of the ACC field could be offset by shifting it right by p bits such that the content can be represented in n bits. A correspondence of the field of packet 40 and that of output packet 160 is shown in FIG. 6. The content of the ACC field could also be divided into data fields 58 of the two packets 160 for output. One possible method for this case is exemplified in FIG. 7. In the example shown in FIG. 7, the lower n bits of m bits data of ACC field 60 are stored in data field 58 of second packet 160-2 shown below, and the higher (m−n) bits of ACC field 60 are sign extended to n bits and stored in data field 58 of packet 160-1.

There are various possible methods other than those described above of converting data for externally outputting the content of the ACC field. Such a processing may be carried out utilizing shifter 30 and selector 32 shown in FIG. 4, or the process may be performed in branching unit 110 shown in FIG. 3. A dedicated circuit may also be provided downstream of branching unit 110.

A result of an arithmetic operation conventionally carried out for the input data could be added to the content of the ACC field as an accumulation process, other than simply adding the left data to the content of the ACC field. In the data driven processor according to this embodiment, an instruction system for executing following accumulation operations is supported.

It is possible to carry out the following operations for the input left and right data.

(1) multiplication
(2) addition
(3) subtraction
(4) square

For the result of the operation performed for the right and the left data, following processings are possible.

i) execute shift processing
ii) not execute shift processing

For the result of such shift processing (or processing without shifting) and the content of the ACC field, following processings are possible.

A) add the result to ACC
B) overwrite the ACC field with the result

After the ACC field is thus updated, methods of outputting the data could be any of the following.

a) output the updated result of the ACC
b) shift and output the updated result of the ACC
c) output the content of the ACC before it is updated
d) shift and output the content of the ACC before it is updated e) output the operation results of (1) to (4)

f) shift and output the operation results of (1) to (4)

This embodiment provides an instruction system in which a combination of each of the operation for the left and the right data, the shift processing for the result, the update of the ACC using the result, and the method of selecting data to be output and the shift is implemented as one instruction.

Figure 8:
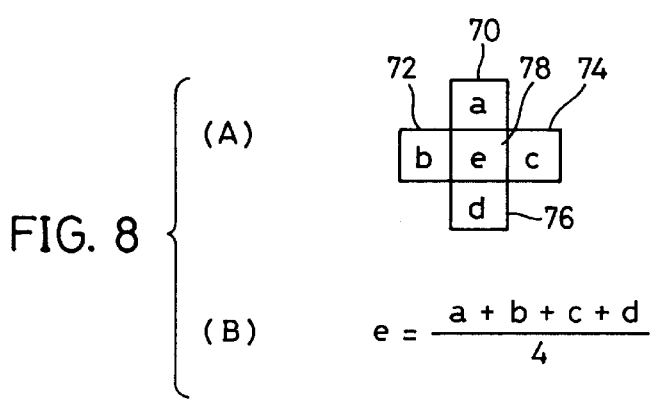
FIG. 8 schematically illustrates an image processing showing an operation of the data driven processor of the embodiment.

Specific operations of the operation apparatus will next be explained taking the image processing for the pixels 70, 74, 76 and 78 shown in FIG. 8 as one example. FIG. 8(A) illustrates an image of a process in which a pixel 78 with image data is obtained as an average value of the pixels 70, 72, 74 and 76 at four surrounding points, and FIG. 8(B) shows a method of computing the value e of pixel 78 in a form of an expression showing the values of pixels 70, 72, 74 and 76 as a, b, c and d, respectively.

Figures 9, 10, 11:
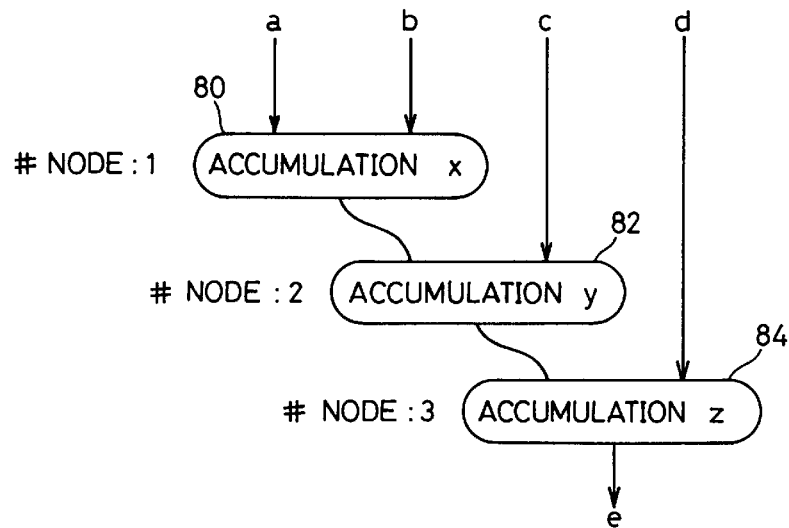
FIG. 9 is a data flow graph of the image processing shown in FIG. 8.
FIG. 10 schematically shows a data flow program corresponding to the data flow graph shown in FIG. 9.
FIG. 11 shows zero generation packets supplied to a data driven processor, corresponding to the data flow graph shown in FIG. 9.

FIG. 9 is a data flow graph showing the above described process. In the data flow graph shown in FIG. 9, node numbers are provided to respective operations as identifiers for distinguishing them. A node 80 is a first node for which an accumulation x is executed. A node 82 is a second node for which an accumulation y is executed. A node 84 is a third node for which an accumulation z is performed.

A characteristic of general image data is that image data are constructed by horizontally scanning an image from the upper left of the image to the lower scanning lines. The order of arrival of the image data to the processing apparatus is thus a, b, c, d. The data flow graph of FIG. 9 implements an algorithm in which data are processed sequentially according to the order of arrival of data a, b, c, d.

It is noted that in FIG. 9, the accumulation x shows a combination of (2), ii, B, and a of the combinations of the processes described above, the accumulation y shows a combination of (2), ii, A and a, and the accumulation z shows a combination of (2), i, A and a.

FIG. 10 schematically shows a data flow program 90 corresponding to the data flow graph of FIG. 9 stored in program storage 108. The data flow program includes nodes, and information necessary for specifying which instruction of which node should be executed after the processing of the respective nodes, or the like. A memory in program storage 108 is referenced using the node number of the packet arrived in program storage 108 as a "preceding node number", the corresponding instruction code and next node number are read out and then contents of the instruction code field and the node number field in the packet are replaced with "instruction code" and "next node number" thus read out.

FIG. 11 shows how the content of the packet changes with the execution of the program in the data driven processor shown in FIGS. 3 and 4.

FIGS. 11(A)–(D) are the four input packets of generation zero for this program. These packets respectively have input data (A)–(D) as well as an information for designating the node to which respective data are input (node number and instruction code), and a common generation number (=0) which shows that these packets are of a set of data to be processed simultaneously. The ACC field is initialized to zeroes at the point of input to data driven processor 100.

FIG. 12 shows a resultant packet which is output as a result of two packets shown in FIGS. 11(A) and 11(B) paired by matching control unit 104 shown in FIG. 3. Matching control unit 104 detects, out of the input packets, a pair of data packets with identical instruction code, generation number, and node number as the right and left input data to the node, and generates the packet with the right and the left data fields shown in FIG. 12 and provides the same to operation unit 106.

FIG. 13 shows a packet output from node 80 as a result of the processing of the accumulation x in node 80 shown in FIG. 9. As illustrated in FIG. 13, in the case of this processing, both of the ACC field and the data field has the operation result "a+b" written therein.

The packet shown in FIG. 13 is provided from operation unit 106 to program storage 108, the node number and the instruction code are replaced in accordance with above described next instruction replace procedure, and the packet shown in FIG. 14 is generated. The packet shown in FIG. 14 is a left input packet for node 82 of FIG. 9.

FIGS. 15 and 16 show output packets of node numbers 82 and 84 as FIG. 13. An instruction code corresponding to preceding node number 3 shown as "external output" in FIG. 10 is written in the instruction field of the packet shown in FIG. 16, resulting in the packet externally output via branching unit 110 and path 114.

Thus, the data driven processor in the embodiment described above is capable of internally performing an operation process spanning a plurality of packets, for example, an accumulation process, for each of a plurality of generations. The hardwares for implementing the process could be simplified and easily controlled compared with the case in which a plurality of data latches are provided for storing accumulation values of each generation. The software for implementing such a process could also be simple. Therefore the overhead in executing an operation could be reduced, leading to a high speed processing. The bit width of an accumulated value is made larger than that of a regular operation, so that such a disadvantage that the result of the operation is largely different from the correct one due to the overflow of the result of the accumulation operation carried out in the data driven processor is less likely. The same hardware can be used for different applications. The apparatus according to the present invention, therefore, can obtain at reduced cost a performance better than that of an apparatus in which different hardwares are employed for different applications.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data processing apparatus comprising:

matching means for matching externally received packets necessary for execution of an instruction and for outputting a matched packet in a form of an extended packet having a prescribed field added thereto, the externally received packet having regular packet form including at least a destination field, a data field and an instruction field;

operation means, coupled to said matching means, for carrying out a process on a content of the data field and a content of the prescribed field of the matched packet in accordance with a content of the instruction field of the matched packet and for outputting a resultant packet having an updated data field or an updated prescribed field;

program storage means, coupled to said operation means, for adding information about an instruction to be executed next to the resultant packet to output a program updated packet; and branching means, coupled to said program storage means, for selectively branching the program updated packet, in accordance with a content of the destination field of the program updated packet, to said matching means in the form of an extended packet or branching the program updated packet externally of the data processing apparatus as converted into regular packet form without the prescribed field.

2. The data processing apparatus of claim 1, wherein said operation means comprises:

an arithmetic unit for carrying out a process on the content of the data field of the matched packet in accordance with the content of the instruction field of the matched packet;

an adder for adding an output of said arithmetic unit to the content of the prescribed field of the matched packet; and packet assembling means for assembling and outputting the resultant packet in accordance with an output of said adder and the contents of the instruction field and the prescribed field of the matched packet.

3. The data processing apparatus of claim 1, wherein a bit precision of the prescribed field is greater than a bit precision of the data field in regular packet form.

4. The data processing apparatus of claim 1, wherein said matching means sets an initial value of the prescribed field of the matched packet in accordance with a prescribed manner based on a content of the externally received packet.

5. The data processing apparatus of claim 1, wherein the prescribed field comprises an accumulated value holding field.

6. A data processing apparatus which externally inputs/outputs data in a form of a regular packet including at least a destination field, a data field, and an instruction field, comprising:

internal path means for externally receiving a packet, converting the externally received packet into a form of an extended packet with a prescribed field added thereto and circulating the extended packet in the data processing apparatus;

matching control means placed in said internal path means for carrying out matching of packets necessary for execution of an instruction and outputting a packet including said prescribed field added thereto and all the data required for executing an instruction onto said internal path means;

operation means placed in said internal path means for carrying out a process designated by a content of the instruction field based on data in the data field and data in said prescribed field of the packet output from said matching control unit, and outputting a resultant packet with an updated content of the data field or said prescribed field onto said internal path means;

program storage means with a data flow program prestored therein, placed in said internal path means, for outputting a packet including information about an instruction to be executed next using the packet output from said operation means onto said internal path means; and branching means placed in said internal path means for branching the packets output from said program storage means into said internal path means as extended packets and as an external output of said internal path means according to a content of the destination field of the output packets, a packet to be externally output being converted from the form of the extended packet to the form of the regular packet.

7. The data processing apparatus according to claim 6, wherein said operation means comprises:

an arithmetic circuit for carrying out a process, designated by the content of the instruction field, on a content of the data field of the packet output from said matching control means;

an adding circuit for adding an output from said arithmetic circuit to a content of said prescribed field of a supplied extended packet output from said matching control means; and packet assembling means for assembling and outputting the resultant packet from an output of said adding circuit and the content of the instruction field and said prescribed field of the supplied extended packet.

8. The data processing apparatus according to claim 7, wherein bit precision is selected such that a bit precision of said prescribed field is higher than a bit precision of the data field in the form of a regular packet.

9. The data processing apparatus according to claim 8, wherein said packet assembling means comprises:

shift means for receiving the output of said adding circuit, responsive to the content of the instruction field of the supplied extended packet, and shifting the output from said adding circuit by a prescribed number of bits;

first selecting means for receiving an output from said shift means and the content of said prescribed field of the supplied extended packet, responsive to the content of the instruction field of the supplied extended packet, and selectively outputting the output from said shift means or the content of said prescribed field of the supplied extended packet; and second selecting means for receiving the output from said shift means and the output of said adding circuit, responsive to the content of the instruction field of the supplied extended packet, and selectively outputting the output from said shift means or the output of said adding circuit.

10. The data processing apparatus according to claim 9, wherein said internal path means sets an initial value, determined according to a prescribed manner, in said prescribed field upon conversion of the externally received packet into the form of an extended packet.

11. The data processing apparatus according to claim 10, wherein said internal path means sets a fixed initial value in said prescribed field upon conversion of the externally received packet into the form of an extended packet.

12. The data processing apparatus according to claim 10, wherein said internal path means sets an initial value, determined according to a content of the externally received packet, in said prescribed field upon conversion of the externally received packet into the form of an extended packet.

13. The data processing apparatus according to claim 8, wherein said internal path means sets an initial value, determined according to a prescribed manner, in said prescribed field upon conversion of the externally received packet into the form of an extended packet.

14. The data processing apparatus according to claim 13, wherein said internal path means sets a fixed initial value in said prescribed field upon conversion of the externally received packet into the form of an extended packet.

15. The data processing apparatus according to claim 13, wherein said internal path means sets an initial value, determined according to the content of the externally received packet, in said prescribed field upon conversion of the externally received packet into the form of an extended packet.

16. The data processing apparatus according to claim 7, wherein said packet assembling means comprises:

shift means for receiving the output of said adding circuit, responsive to the content of the instruction field of the supplied extended packet, and shifting the output from said adding circuit by a prescribed number of bits;

first selecting means for receiving an output from said shift means and the content of said prescribed field of the supplied extended packet, responsive to the content of the instruction field of the supplied extended packet, and selectively outputting the output from said shift means or the content of said prescribed field of the supplied extended packet; and second selecting means for receiving the output from said shift means and the output of said adding circuit, responsive to the content of the instruction field of the supplied extended packet, and selectively outputting the output from said shift means or the output of said adding circuit.

17. The data processing apparatus according to claim 16, wherein said internal path means sets an initial value, determined according to a prescribed manner, in said prescribed field upon conversion of the externally received packet into the form of an extended packet.

18. The data processing apparatus according to claim 17, wherein said internal path means sets a fixed initial value in said prescribed field upon conversion of the externally received packet into the form of an extended packet.

19. The data processing apparatus according to claim 17, wherein said internal path means sets an initial value, determined according to the content of the externally received packet, in said prescribed field upon conversion of the externally received packet into the form of an extended packet.

20. The data processing apparatus according to claim 7, wherein said internal path means sets an initial value, determined according to a prescribed manner, in said prescribed field upon conversion of the externally received packet into the form of an extended packet.

21. The data processing apparatus according to claim 20, wherein said internal path means sets a fixed initial value in said prescribed field upon conversion of the externally received packet into the form of an extended packet.

22. The data processing apparatus according to claim 20, wherein said internal path means sets an initial value, determined according to the content of the externally received packet, in said prescribed field upon conversion of the received packet into the form of an extended packet.

23. The data processing apparatus according to claim 6, wherein bit precision is selected such that a bit precision of said prescribed field is higher than a bit precision of the data field in the form of a regular packet.

24. The data processing apparatus according to claim 6, wherein said internal path means sets an initial value, determined according to a prescribed manner, in said prescribed field upon conversion of the externally received packet into the form of an extended packet.

25. The data processing apparatus of claim 6, wherein the prescribed field comprises an accumulated value holding field.

* * * * *